(12) United States Patent
Christensen et al.

(10) Patent No.: US 9,905,844 B2
(45) Date of Patent: Feb. 27, 2018

(54) SOLID STATE BATTERY WITH VOLUME CHANGE MATERIAL

(71) Applicant: Robert Bosch GmbH, Stuttgart (DE)

(72) Inventors: John F. Christensen, Mountain View, CA (US); Aleksandar Kojic, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 415 days.

(21) Appl. No.: 14/468,711

(22) Filed: Aug. 26, 2014

(65) Prior Publication Data

US 2015/0064520 A1  Mar. 5, 2015

Related U.S. Application Data

(60) Provisional application No. 61/870,896, filed on Aug. 28, 2013.

(51) Int. Cl.
| | |
|---|---|
| *H01M 4/134* | (2010.01) |
| *H01M 4/38* | (2006.01) |
| *H01M 4/04* | (2006.01) |
| *H01M 4/136* | (2010.01) |
| *H01M 4/58* | (2010.01) |
| *H01M 10/052* | (2010.01) |
| *H01M 10/0562* | (2010.01) |
| *H01M 4/36* | (2006.01) |
| *H01M 4/62* | (2006.01) |

(52) U.S. Cl.
CPC ......... *H01M 4/134* (2013.01); *H01M 4/0423* (2013.01); *H01M 4/0428* (2013.01); *H01M 4/136* (2013.01); *H01M 4/386* (2013.01); *H01M 4/5815* (2013.01); *H01M 10/052* (2013.01); *H01M 10/0562* (2013.01); *H01M 4/366* (2013.01); *H01M 4/62* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 2006/0097691 | A1 | 5/2006 | Green |
| 2007/0059584 | A1 | 3/2007 | Nakano et al. |
| 2008/0070112 | A1 | 3/2008 | Kogetsu et al. |
| 2008/0081257 | A1 | 4/2008 | Yoshida et al. |
| 2009/0202908 | A1 | 8/2009 | Sumihara et al. |
| 2010/0040951 | A1 | 2/2010 | Yamamoto et al. |
| 2010/0151329 | A1 | 6/2010 | Sato et al. |

(Continued)

FOREIGN PATENT DOCUMENTS

WO  2010007579 A1  1/2010

OTHER PUBLICATIONS

International Search Report and Written Opinion corresponding to PCT Application No. PCT/US2014/052902, dated May 22, 2015 (13 pages).

(Continued)

*Primary Examiner* — Sarah A. Slifka
(74) *Attorney, Agent, or Firm* — Maginot Moore & Beck LLP (57) ABSTRACT

In one embodiment, an electrochemical cell includes a first electrode, a second electrode spaced apart from the first electrode, the second electrode including at least one first thin-film deposition formed volume change accommodating feature, and a separator positioned between the first electrode and the second electrode.

12 Claims, 8 Drawing Sheets

(56) References Cited

U.S. PATENT DOCUMENTS

2011/0294005 A1    12/2011  Kuriki et al.
2013/0052532 A1     2/2013  Kim et al.
2013/0065134 A1     3/2013  Ogawa et al.

OTHER PUBLICATIONS

Amatucci, G. et al., "Fluoride based electrode materials for advanced energy storage devices", Journal of Fluorine Chemistry, 2007. 128(4): p. 243-262.
Cabana, J. et al., "Beyond Intercalation-Based Li-Ion Batteries: The State of the Art and Challenges of Electrode Materials Reacting Through Conversion Reactions", Advanced Energy Materials, 2010. 22(35): p. E170-E192.
USABC Goals for Advanced Batteries for EVs. 2002, United States Advanced Battery Consortium. http://www.uscar.org/commands/files_download.php?files_id=27.
Ohtomo, T. et al., "All solid-state lithium secondary batteries using the 75Li2S—25P2S5 glass an the 70Li2S—30P2S5 glass-ceramic as solid electrolytes", Journal of Power Sources 233 (2013) 231-235.
Wiers et al. "A Solid Lithium Electrolyte via Addition of Lithium Isopropoxide to a Metal-Organic Framework with Open Metal Sites," Journal of American Chemical Society, 2011, 133 (37), pp. 14522-14525.
Christensen et al., "A critical Review of Li/Air Batteries", Journal of the Electrochemical Society 159(2) 2012, R1-R30.
Supplemental European Search Report corresponding to European Patent Application 14 86 2503 (9 pages).

SOLID STATE BATTERY WITH VOLUME CHANGE MATERIAL

CROSS REFERENCE

This application claims the benefit of U.S. Provisional Application No. 61/870,896 filed Aug. 28, 2013, the entire contents of which is herein incorporated by reference.

FIELD OF THE DISCLOSURE

The present disclosure relates to batteries and more particularly to solid state batteries.

BACKGROUND

Rechargeable lithium-ion batteries are attractive energy storage systems for portable electronics and electric and hybrid-electric vehicles because of their high specific energy compared to other electrochemical energy storage devices. A typical Li-ion cell contains a negative electrode, a positive electrode, and a separator region between the negative and positive electrodes. Both electrodes contain active materials that insert or react with lithium reversibly. In some cases the negative electrode may include lithium metal, which can be electrochemically dissolved and deposited reversibly. The separator contains an electrolyte with a lithium cation, and serves as a physical barrier between the electrodes such that none of the electrodes are electronically connected within the cell.

Typically, during charging, there is generation of electrons at the positive electrode and consumption of an equal amount of electrons at the negative electrode, and these electrons are transferred via an external circuit. In the ideal charging of the cell, these electrons are generated at the positive electrode because there is extraction via oxidation of lithium ions from the active material of the positive electrode, and the electrons are consumed at the negative electrode because there is reduction of lithium ions into the active material of the negative electrode. During discharging, the exact opposite reactions occur.

Batteries with a lithium metal negative electrode afford exceptionally high specific energy (in Wh/kg) and energy density (in Wh/L) compared to batteries with conventional carbonaceous negative electrodes. However, the cycle life of such systems is rather limited due to (a) significant volume changes in the cell sandwich during every cycle as the Li metal is stripped and plated, (b) formation of dendrites during recharge that may penetrate the separator and short the cell and/or result in fragmentation and capacity loss of the negative electrode; (c) morphology changes in the metal upon extended cycling that result in a large overall volume change in the cell; and (d) changes in the structure and composition of the passivating layer that forms at the surface of the metal when exposed to certain electrolytes, which may isolate some metal and/or increase the resistance of the cell over time.

When high-specific-capacity negative electrodes such as a metal are used in a battery, the maximum benefit of the capacity increase over conventional systems is realized when a high-capacity positive electrode active material is also used. For example, conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g, which is quite low compared to the specific capacity of lithium metal, 3863 mAh/g. The highest theoretical capacity for which some practical cycling has been achieved for a lithium-ion positive electrode is 1168 mAh/g (based on the mass of the lithiated material), which is shared by $Li_2S$ and $Li_2O_2$. Other high-capacity materials include $BiF_3$ (303 mAh/g, lithiated), $FeF_3$ (712 mAh/g, lithiated), $LiOH.H_2O$ (639 mAh/g), and others. Unfortunately, all of these materials react with lithium at a lower voltage compared to conventional oxide positive electrodes, hence limiting the theoretical specific energy; however, the theoretical specific energies are still very high (>800 Wh/kg, compared to a maximum of ~500 Wh/kg for a cell with lithium negative and conventional oxide positive electrodes).

Figure 1:
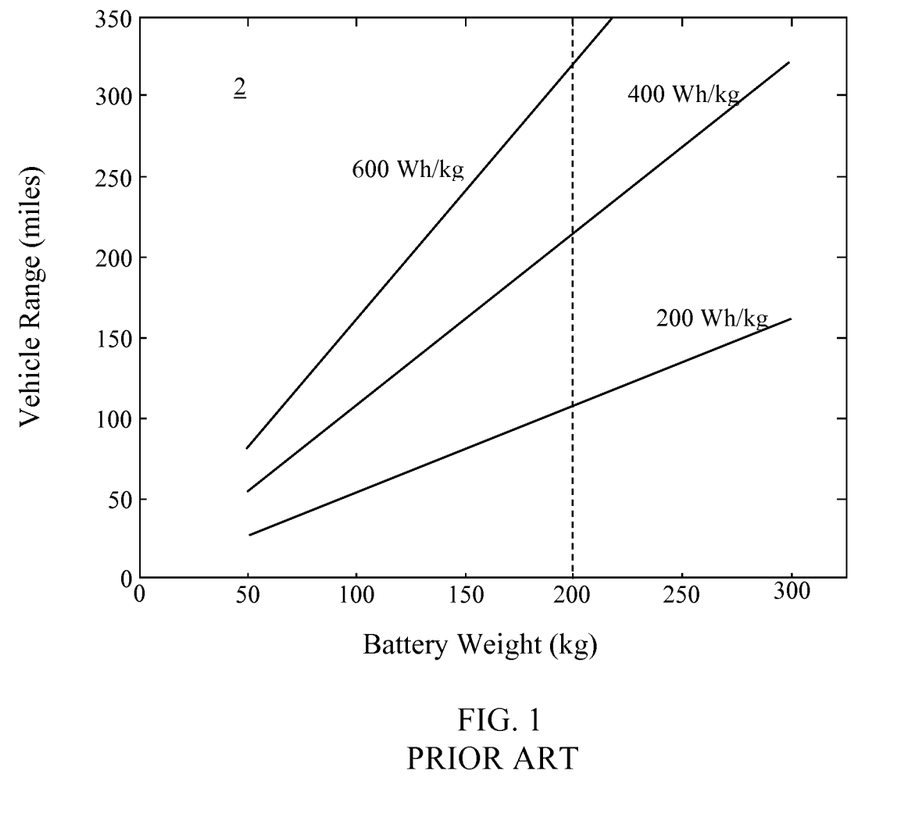
FIG. 1 depicts a plot showing the relationship between battery weight and vehicular range for various specific energies.

FIG. 1 depicts a chart 2 showing the range achievable for a vehicle using battery packs of different specific energies versus the weight of the battery pack. In the chart 10, the specific energies are for an entire cell, including cell packaging weight, assuming a 50% weight increase for forming a battery pack from a particular set of cells. The U.S. Department of Energy has established a weight limit of 200 kg for a battery pack that is located within a vehicle. Accordingly, only a battery pack with about 600 Wh/kg or more can achieve a range of 300 miles.

Lithium-based batteries have a sufficiently high specific energy (Wh/kg) and energy density (Wh/L) that they are now being used in electric-powered vehicles. However, in order to power a full-electric vehicle with a range of several hundred miles, a battery with a higher specific energy than the present state of the art (an intercalation system with a graphite anode and transition-metal oxide cathode) is necessary.

Figure 2:
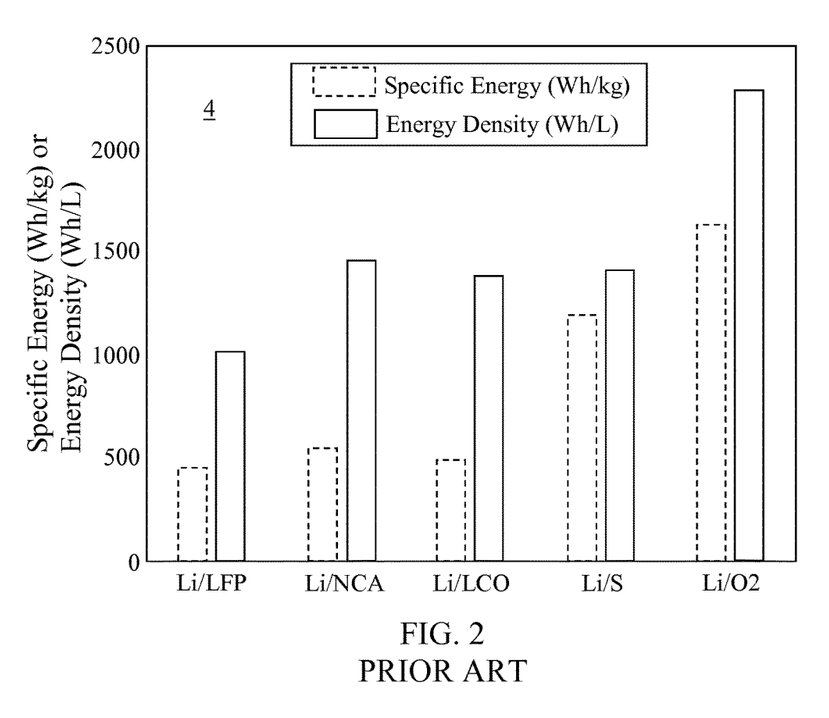
FIG. 2 depicts a chart of the specific energy and energy density of various lithium-based cells.

Some options which provide higher specific energy as compared to the currently utilized batteries are possible. For example, FIG. 2 depicts a chart 4 which identifies the specific energy and energy density of various lithium-based chemistries. In the chart 4, only the weight of the active materials, current collectors, binders, separator, and other inert material of the battery cells are included. The packaging weight, such as tabs, the cell can, etc., are not included. As is evident from the chart 4, the lithium-sulfur battery, which uses a lithium metal negative electrode and a positive electrode that reduces sulfur to form lithium sulfide, has a significantly higher specific energy than the present state of the art.

There are significant challenges that must be addressed for the lithium-sulfur system to become commercially viable. Important challenges include increasing the cycle life (current state of the art is 100 to several hundred cycles; target is >500, preferably >2000), increasing the utilization of sulfur (typical utilization is below 75% due to passivation of the positive electrode by $Li_2S$ or $Li_2S_2$, which are electronically insulating), increasing the mass fraction of sulfur in the positive electrode (typically the mass fraction is below 50%), and increasing the rate capability of the cell (target discharge rate is 1C or higher). While some Li/S cells described in the literature fulfill some of the objectives for cycle life, specific energy, and specific power, none of these cells adequately address all of the issues as would be needed to realize a commercial cell.

Another challenge associated with the sulfur cathode is that it undergoes a large volume change (~70%) when it is fully lithiated (S→$Li_2S$).

Lithium metal is very challenging to cycle due to the formation of dendrites during battery charging and other morphological changes that occur during cycling. An alternative to lithium metal is silicon, which alloys with lithium during battery charging up to a composition of $Li_{4.4}Si$. This material has a much higher capacity than graphite (4200 mAh/g compared to 372 mAh/g for graphite), but also undergoes a very large volume change upon full lithiation (~300%).

These high-volume change materials, while they have attractive capacities, are difficult to cycle in batteries due to the generation of mechanical stress within the materials and at material interfaces. The rate of capacity fade is generally high due to material fracture and/or loss of adhesion between battery components (e.g., anode from current collector). Volume changes are particularly difficult to manage in all-solid-state batteries.

What is needed, therefore, is a solid state electrochemical cell which addresses one or more of the above identified issues.

SUMMARY

In accordance with one embodiment an electrochemical cell includes a first electrode, a second electrode spaced apart from the first electrode, the second electrode including at least one first thin-film deposition formed volume change accommodating feature, and a separator positioned between the first electrode and the second electrode.

In one or more embodiments, the at least one first thin-film deposition formed volume change accommodating feature includes a void having a first plurality of disks formed therein, each of the first plurality of disks extending generally along an axis defined by a flow of ions within the cell during charge or discharge of the cell.

In one or more embodiments the second electrode includes an anode, and the first plurality of disks include a form of silicon.

In one or more embodiments the second electrode includes at least one second thin-film deposition formed volume change accommodating feature.

In one or more embodiments the at least one second thin-film deposition formed volume change accommodating feature includes a void having a second plurality of disks formed therein, each of the second plurality of disks extending generally along the axis.

In one or more embodiments the second plurality of disks include a form of sulfur.

In one or more embodiments the void in the second electrode is filled with a compressible substance.

In one or more embodiments the separator includes a first layer adjacent the first electrode, a second layer positioned between the first layer and the second electrode, and a plurality of solid electrolyte components extending along the axis from the first layer toward the second layer.

In one or more embodiments the at least one first thin-film deposition formed volume change accommodating feature includes a plurality of voids having a generally circular cross-section along a plane perpendicular to an axis defined by a flow of ions within the cell during charge or discharge of the cell.

In one or more embodiments a method of forming an electrochemical cell includes providing a first current collector, forming at least one first volume change accommodating feature associated with a first structure supported by the first current collector using a thin-film deposition process, and positioning a separator between (i) a first electrode including the first current collector, the at least one first volume change accommodating feature, and the first structure, and (ii) a second electrode.

In one or more embodiments forming at least one first volume change accommodating feature includes forming a void having a first plurality of disks formed therein, each of the first plurality of disks extending generally along an axis perpendicular to a surface of the first current collector.

In one or more embodiments forming at least one first volume change accommodating feature includes forming at least one first volume change accommodating feature associated with a silicon structure supported by the first current collector using the thin-film deposition process.

In one or more embodiments, a method includes providing a second current collector, and forming at least one second volume change accommodating feature associated with a second structure supported by the second current collector using the thin-film deposition process, wherein the second electrode includes the second current collector the at least one second volume change accommodating feature and the second structure.

In one or more embodiments forming at least one second volume change accommodating feature includes forming a void having a second plurality of disks formed therein, each of the second plurality of disks extending generally along the axis when the cell is finally formed.

In one or more embodiments forming at least one second volume change accommodating feature includes forming at least one second volume change accommodating feature associated with a sulfur structure supported by the second current collector using the thin-film deposition process.

In one or more embodiments, a method includes filling the void with the second plurality of disks formed therein with a compressible substance.

In one or more embodiments positioning the separator includes providing a first layer, providing a second layer, extending a plurality of solid electrolyte components between the first layer and the second layer, positioning the first layer adjacent the first structure, and positioning the second layer between the first layer and the second structure, such that the plurality of solid electrolyte components extend along the axis when the cell is finally formed.

In one or more embodiments forming at least one first volume change accommodating feature includes forming a first plurality of voids using the thin-film deposition process, each of the first plurality of voids having a generally circular cross-section along a plane perpendicular to an axis defined by a flow of ions within the cell during charge or discharge of the cell when the cell is finally formed.

In one or more embodiments forming at least one first volume change accommodating feature includes forming a second plurality of voids using the thin-film deposition process, each of the second plurality of voids having a generally ovoid cross-section along the plane perpendicular to the axis.

DESCRIPTION

For the purpose of promoting an understanding of the principles of the disclosure, reference will now be made to the embodiments illustrated in the drawings and described in the following written description. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

Figure 3:
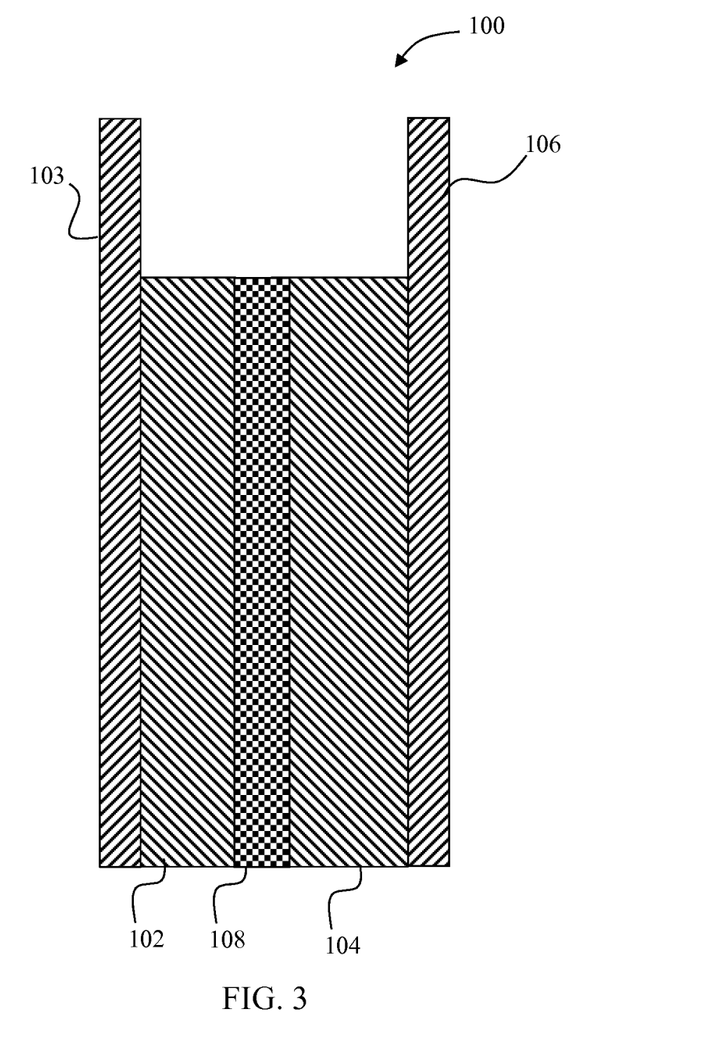
FIG. 3 depicts a simplified cross sectional view of an electrochemical cell.

FIG. 3 depicts a simplified cross-sectional view of an electrochemical cell 100 which includes an anode 102 with a current collector 103, a cathode 104 with an aluminum current collector 106, and a separator structure 108. The anode 102 includes lithium metal or a lithium alloy metal. The anode 104 is sized such that it has at least as much capacity as the cathode 106, and preferably at least 10% excess capacity and in some embodiments up to 50% excess capacity at beginning of life and full charge to account for Li metal that may be consumed in side reactions that take place during cycling. The anode 102 contains Li metal or some other Li-insertion material, such as Si or Sn or a Si or Sn containing alloy, that can reversibly insert and extract Li ions electrochemically. The current collector 103 may be made of copper. In some embodiments, the current collector 103 is omitted and Li metal is used to conduct electrons to and from the electrode.

Figure 4:
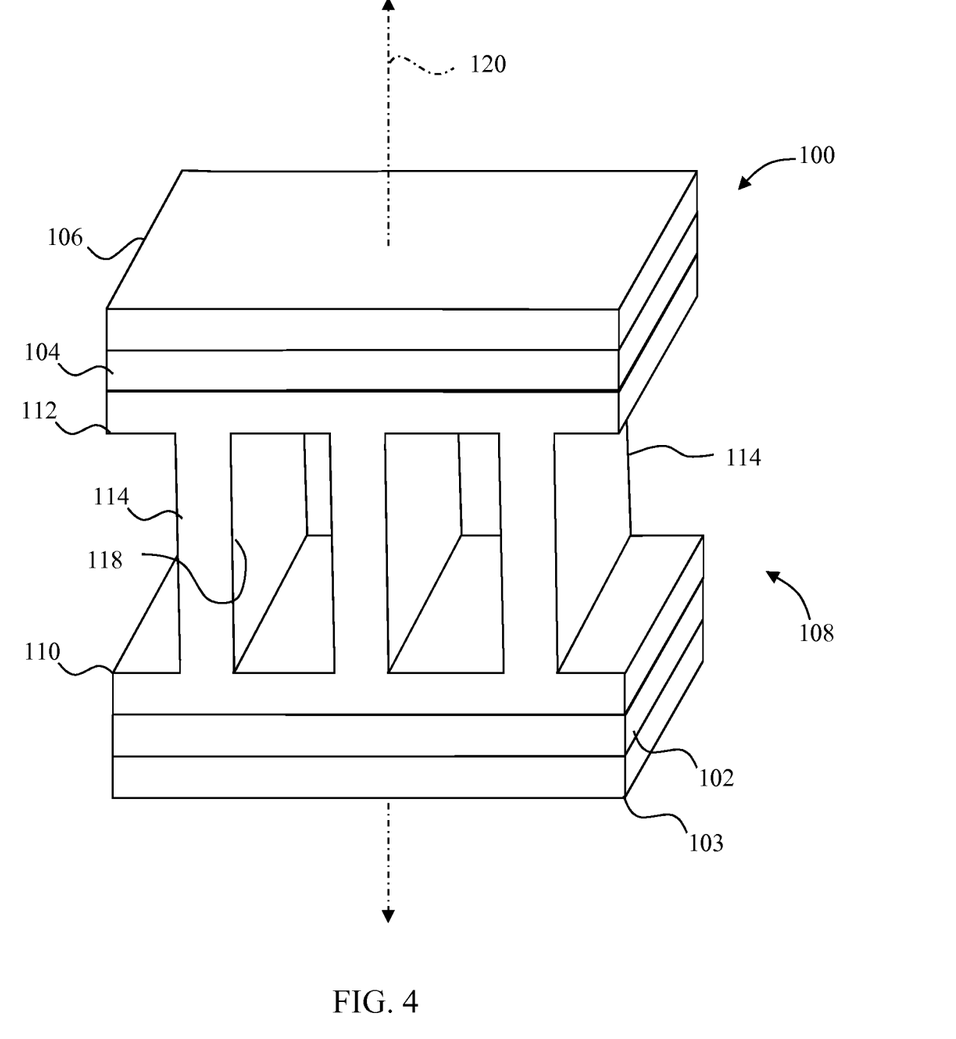
FIG. 4 depicts a partial side perspective view of the cell of FIG. 3 showing a separator with an open cell microstructured composite separator with solid-electrolyte components in the form of columns which inhibits dendrite formation while allowing flexing of the anodes.

In some embodiments, the separator 108 is a microstructured composite separator which conducts lithium ions between the anode 102 and the cathode 104 while blocking electrons. For example, FIG. 4 depicts a partial perspective view of the cell 100 wherein the separator 108 includes a layer 110 adjacent to the anode 102 and a layer 112 adjacent to the cathode 104. A number of solid-electrolyte components in the form of columns 114 extend between the layer 110 and the layer 112 defining microstructure cavities 118 therebetween. The columns 114 extend between the layer 110 and the layer 112 generally along an axis 120 along which lithium ions flow during charge or discharge of the cell 100. As used herein, the disks or other features are understood to "extend" or be "extending" along an axis when cross-sections taken perpendicular to the axis define a minimum area cross-section. Thus, a cylindrical disk will have a circular cross-section when extending along the axis, not an oval cross-section.

The microstructured composite separator 108 thus consists of regularly spaced solid-electrolyte components 114 which provide sufficient ionic transport (i.e., by providing a sufficiently high volume fraction of conducing material and by limiting the thickness of the structure between the anode and cathode) and provide mechanical resistance to suppress the formation and growth of lithium dendrites in the anode 102. In the embodiment of FIG. 4, solid-electrolyte components 108 are flexible so as to accommodate volume change of the electrodes.

While three columns 114 are shown in FIG. 4, there are more or fewer solid-electrolyte components in other embodiments. In other embodiments, the solid-electrolyte components may be configured in other forms. In some embodiments, the microstructure cavities 118 may be filled with different compositions to provide a desired flexibility and/or to otherwise modify mechanical properties of the microstructured composite separator. More details regarding the microstructured composite separator 108, and other alternative separator configurations, are provided in U.S. application Ser. No. 14/460,798, filed Aug. 15, 2014, the entire contents of which are herein incorporated by reference.

The separator 108 in different embodiments is formed from lithium conducting garnets, lithium conducting sulfides (e.g., $Li_2S$—$P_2S_5$) or phosphates, $Li_3P$, $Li_3N$, LIPON, Li-conducting polymer (e.g., PEO), Li-conducting metal-organic frameworks such as described by Wiers et al. "A Solid Lithium Electrolyte via Addition of Lithium Isopropoxide to a Metal-Organic Framework with Open Metal Sites," Journal of American Chemical Society, 2011, 133 (37), pp 14522-14525, the entire contents of which are herein incorporated by reference, thio-LISiCONs, Li-conducting NaSICONs, $Li_{10}GeP_2S_{12}$, lithium polysulfidophosphates, or other solid Li-conducting material. Other solid electrolyte materials that may be used are described in Christensen et al., "A critical Review of Li/Air Batteries", Journal of the Electrochemical Society 159(2) 2012, the entire contents of which are herein incorporated by reference. Other materials in the separator 108 may include $Li_{7-x}La_3Ta_xZr_{2-x}O_{12}$, wherein $0 \leq X \leq 2$.

The cathode 104 in one embodiment only includes an active Li-insertion material. In various embodiments the cathode 104 includes a sulfur or sulfur-containing material (e.g., PAN-S composite or $Li_2S$); an air electrode; Li-insertion materials such as NCM, $LiNi_{0.5}Mn_{1.5}O_4$, Li-rich layered oxides, $LiCoO_2$, $LiFePO_4$, $LiMn_2O_4$; Li-rich NCM, NCA, and other Li intercalation materials, or blends thereof or any other active material or blend of materials that react with and/or insert Li cations and/or electrolyte anions. The cathode 104 may include Li-conducting polymer, ceramic or other solid, non-polymer electrolyte. The cathode Li-insertion materials may additionally be coated (e.g., via spray coating) with a material such as $LiNbO_3$ in order to improve the flow of ions between the Li-insertion materials and the solid electrolyte, as described in T Ohtomo et al., Journal of Power Sources 233 (2013) 231-235.

Solid electrolyte materials in the cathode 104 may further include lithium conducting garnets, lithium conducting sulfides (e.g., $Li_2S$—$P_2S_5$) or phosphates, $Li_3P$, LIPON, Li-conducting polymer (e.g., PEO), Li-conducting metal-organic frameworks such as described by Wiers et al. "A Solid Lithium Electrolyte via Addition of Lithium Isopropoxide to a Metal-Organic Framework with Open Metal Sites," Journal of American Chemical Society, 2011, 133 (37), pp 14522-14525, the entire contents of which are herein incorporated by reference, thio-LISiCONs, Li-conducting NaSI- CONs, $Li_{10}GeP_2S_{12}$, lithium polysulfidophosphates, or other solid Li-conducting material. Other solid electrolyte materials that may be used are described in Christensen et al., "A critical Review of Li/Air Batteries", Journal of the Electrochemical Society 159(2) 2012, the entire contents of which are herein incorporated by reference. Other materials in the cathode 104 may include $Li_{7-x}La_3Ta_xZr_{2-x}O_{12}$, wherein 0<X<2, electronically conductive additives such as carbon black, and a binder material. The cathode materials are selected to allow sufficient electrolyte-cathode interfacial area for a desired design.

Figure 5:
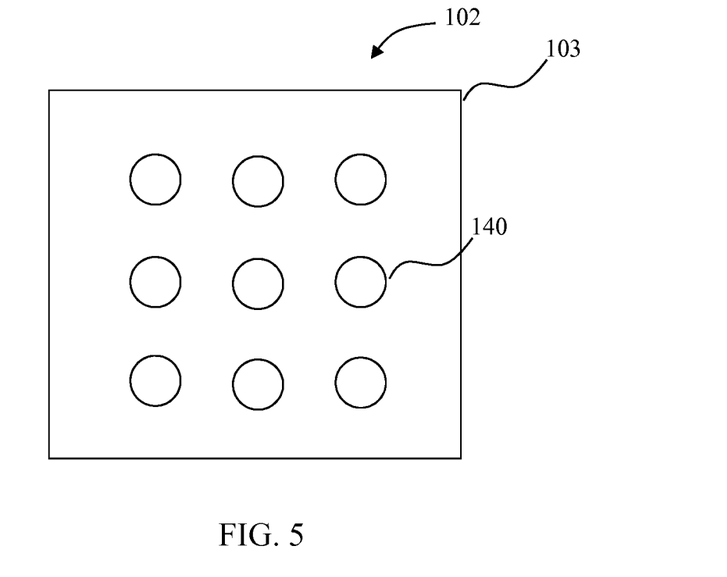
FIG. 5 depicts an aerial view of the cathode of FIG. 3 showing cylindrically shaped disks in a delithiated state.

The anode 102 and cathode 104 both include a volume change accommodating feature(s) formed by a thin-film deposition process, although in other embodiments only the anode 102 or the cathode 104 include a determinatively formed volume change accommodating feature(s). Thin-film deposition processes include chemical vapor deposition, physical vapor deposition, atomic layer deposition, etc. Thin-film deposition enables small feature sizes, shapes and locations in the patterning of the electrodes to be positively controlled. By way of example, FIG. 5 depicts an aerial view of the anode 102. The anode 102 includes determinatively formed features which in this embodiment is a regular array of spaced apart thin disks 140 formed of a Si material in the form of $Li_xSi$, where x=4.4. Conversely stated, the determinatively, or thin-film deposition, formed feature is a void with the thin disks 140 positioned therein since the structure(s) and the void (filled or unfilled) are complementarily formed. Thus, when referring herein to a thin-film deposition formed feature in the form of a structure (e.g., a disk), it is to be understood that the void space about the structure is likewise a thin-film deposition formed feature. Since the structures expand "into" the void spaces, which may be filled with a flexible material, a compressible fluid, or unfilled, the void space(s) are referred to herein as a "volume change accommodating feature".

The thin disks 140 have been deposited on top of the current collector 103 (e.g., Cu, AL for the cathode 104). In some embodiments the disks 140 are <100 μm in diameter. In other embodiments, the disks 140 are <1 μm in diameter. The disks 140 may have a thickness between 50 nm and 200 μm, preferably <2 μm. The volume surrounding the disks is a void or gas, depending upon the environment during the deposition process. The void is a volume change accommodating feature which allows for expansion of the disks 140 without undue structural deformation of the anode 102. In some embodiments, a compressible material is deposited in the volume surrounding the disks 142, the compressible material allowing for expansion of the disks 140 without undue structural deformation of the anode 102. The size, shape, and location of the disks (or the void) are positively controlled because of the above identified thin-film deposition processes, as opposed to processes which rely upon randomly formed features.

Once the anode 102 (or cathode 104) is formed using one of the above described thin-film deposition processes, a solid electrolyte separator such as the separator 108 is deposited or laminated onto the patterned electrode 102/104. Subsequently, the cathode 104 (or anode 102) may be deposited, using the same positively controlled processes discussed above, directly onto the separator 108, or alternatively onto its own current collector 106, and then laminated with the separator 108.

Once the cell 100 is fabricated and enclosed, operation of the cell 100 will result in transfer of lithium (or sodium or other transfer ion) from one electrode 102/104, through the solid electrolyte separator 108, to the other electrode 104/102. Generally, the electrode from which lithium is extracted will contract, while the electrode into which lithium is inserted will expand. The size and spacing of the thin-film deposition formed disks 140 of active electrode material is chosen such that the interstitial volume is minimized when the active material is fully expanded without incurring an undesired level of stress.

Figure 6:
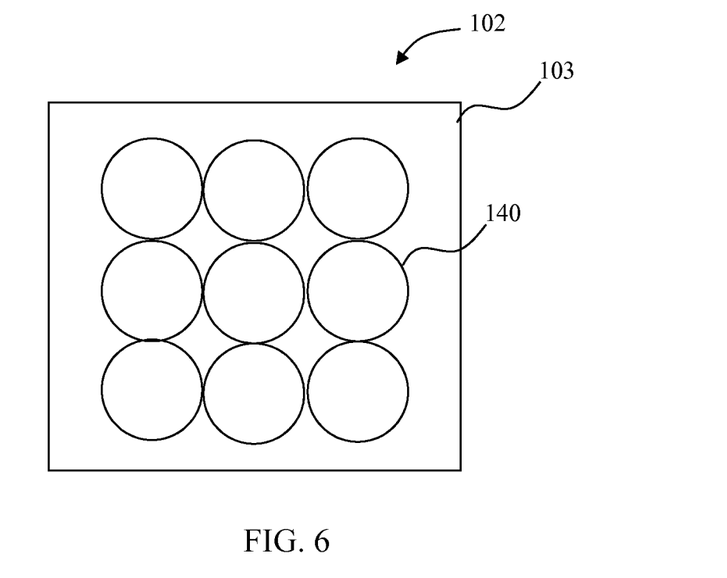
FIG. 6 depicts an aerial view of the cathode of FIG. 3 showing the cylindrically shaped disks in a lithiated state.

By way of example, FIG. 6 depicts the anode 102 in a fully lithiated state. Upon delithiation (i.e., discharge of the cell), the Li leaves the Si and the Si volume is reduced to 25% its original volume. Assuming this volume change is isotropic, the thickness of the electrode drops by 37% and the area of the thin-film deposition formed disks drops by 60%, as depicted in FIG. 5.

Figure 7:
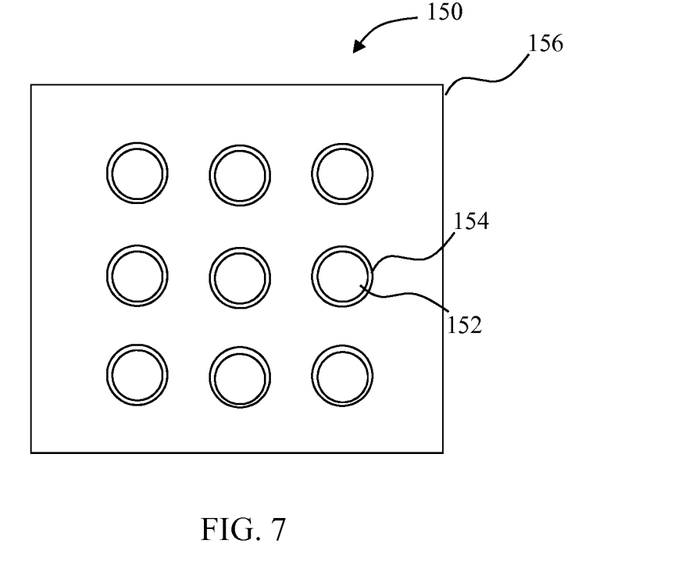
FIG. 7 depicts an aerial view of a cathode showing cylindrically shaped coated disks in a delithiated state.
Figure 8:
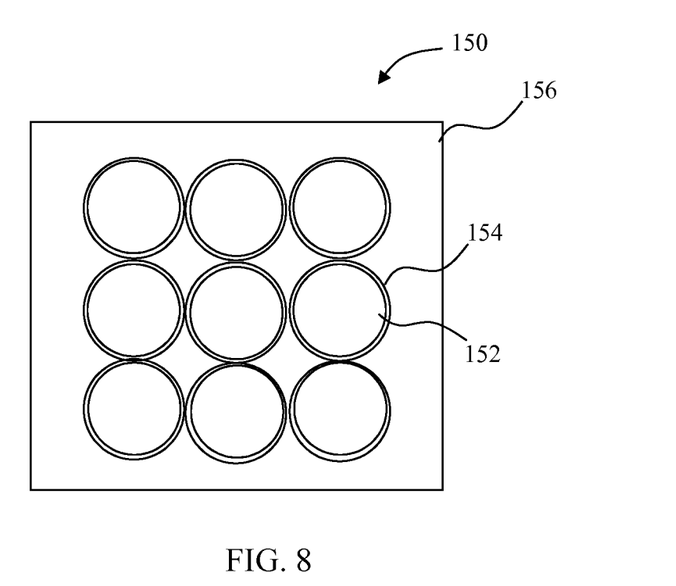
FIG. 8 depicts an aerial view of the cathode of FIG. 7 showing the cylindrically shaped coated disks in a lithiated state.

In some embodiments, thin-film deposition formed Si disks are coated on the circumference by an electronic and/or ionic conductor 144. FIG. 7 depicts an electrode 150 which includes coated thin-film deposition formed disks 152 with a coating 154 on a current collector 156 in a delithiated state. FIG. 8 depicts the coated thin-film deposition formed disks 150 in a lithiated state. The coating 152 improves the cell's power capability. Spacing between the disks 152 is modified to account for the volume occupied by the coating 154.

While the embodiments of FIGS. 5-8 depict Si as an exemplary anode material that undergoes high volume change, another exemplary material is S, used as a cathode material, which undergoes a 70% volume change when it is lithiated to form $Li_2S$. In some embodiments, both electrodes undergo a high volume change. In one such embodiment, thin-film deposition formed Si disks are incorporated in the anode and thin-film deposition formed $Li_2S$ disks are incorporated in the cathode.

Figure 9:
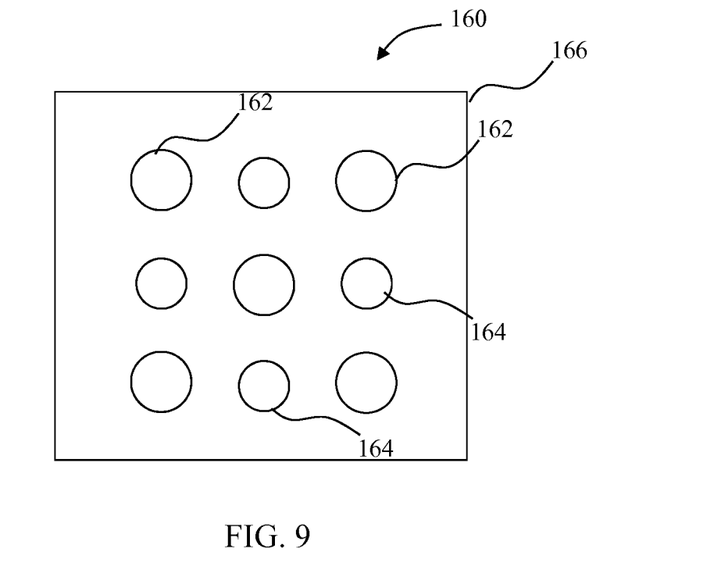
FIG. 9 depicts an aerial view of an anode showing differently sized cylindrically shaped disks of different materials in a delithiated state.

Any electrode material that undergoes volume change may be deposited in the manner described above for the anode 102. In some cases, more than one type of active material is deposited. By way of example, FIG. 9 an anode 160 which includes thin-film deposition formed disks 162 and thin-film deposition formed disks 164 on a current collector 166. The thin-film deposition formed disks 162 are formed from a material that is different from the material used to form the thin-film deposition formed disks 164. Additionally, in this embodiment, the disks 162 and disks 164 have different diameters. Thus, the diameters of the disks need not be identical.

Figure 10:
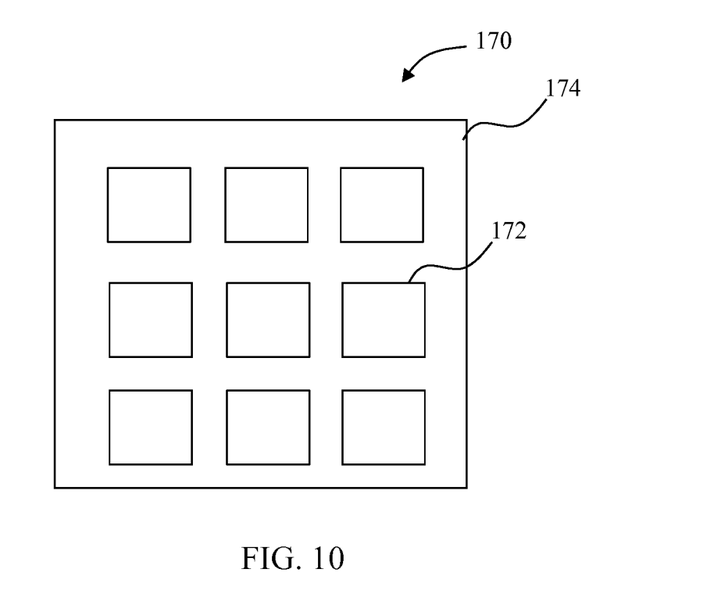
FIG. 10 depicts an aerial view of an anode showing rectangular-shaped disks in a delithiated state.

Moreover, while the above described embodiments incorporate thin-film deposition formed features in the form of spaced apart cylindrically shaped disks, the features may have other shapes. For example, FIG. 10 depicts an anode 170 which includes thin-film deposition formed cubes 172 on a current collector 174. The cubes 172 are substantially rectangular in cross-section.

Figure 11:
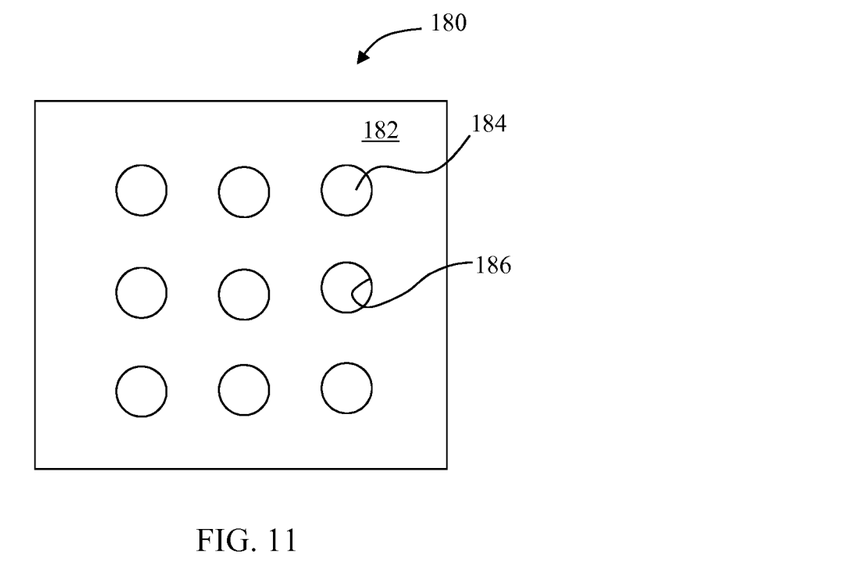
FIG. 11 depicts an aerial view of an anode showing an active material layer including substantially circular voids on a current collector.
Figure 12:
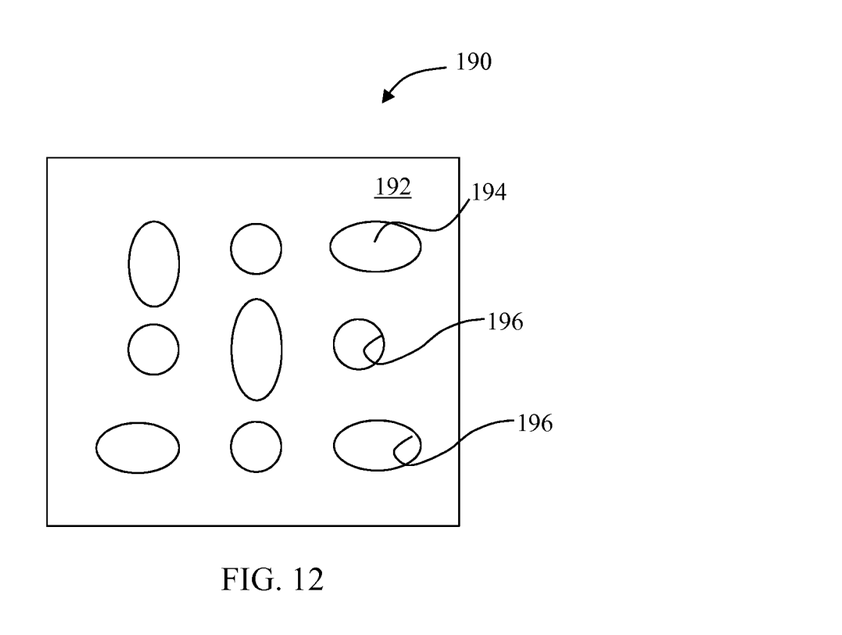
FIG. 12 depicts an aerial view of an anode showing an active material layer including differently sized, and oriented ovoid voids on a current collector.

In further embodiments, an active material layer is formed with a pattern of thin-film deposition formed features in the form of voids. Thus, FIG. 11 depicts an anode 180 which includes an active material layer 182 on a current collector 184. A number of thin-film deposition formed circular (in a plane perpendicular to the axis defined by the flow of lithium ions during charge or discharge of the cell) voids 186 are provided in the active material layer 182, through which the current collector 184 is visible. FIG. 12 depicts an anode 190 which includes an active material layer 192 on a current collector 194. A number of differently sized and shaped thin-film deposition formed oval (in a plane perpendicular to the axis defined by the flow of lithium ions during charge or discharge of the cell) voids 196 are provided in the active material layer 192, through which the current collector 194 is visible. The voids and spacing in FIGS. 11 and 12 are of similar scale to the disks and spacing in FIGS. 5 through 10.

The various embodiments and features described above can be combined in any desired combination. Thus, in some embodiments a fully dense electrode is used as one of the electrodes, while a patterned electrode is used as the other electrode. For instance, a fully dense Li metal anode is used along with a patterned sulfur cathode. In some embodiments, the cell is fabricated with the separator directly contacting the negative current collector, and with a patterned positive electrode with a lithium-containing material such as $Li_2S$, such that Li is deposited between the negative current collector and the separator during the first charge. In further embodiments, one or more electrode is deposited directly onto the solid electrolyte separator and later laminated with the current collectors in a second step.

The above described embodiments, which can be provided in bipolar or double-sided designs, provide a solid-state battery cell that includes active materials that change volume depending upon state of charge. The electrodes of the cell are patterned such that volume changes are accommodated by voids or compressible inactive material. The patterning enhances the mechanical stability and therefore the cycle life of the cell.

The above described embodiments thus provide accommodation of volume change in order to minimize mechanical stress in the cells, thereby increasing cell cycle life. The use of small feature sizes in the patterning of the electrodes improves both mechanical stability and power capability. By accommodating high-volume change materials, materials with higher energy density can be used.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. An electrochemical cell, comprising:
   a first electrode;
   a second electrode spaced apart from the first electrode, the second electrode including at least one first thin-film deposition formed volume change accommodating feature; and
   a separator positioned between the first electrode and the second electrode, wherein the separator comprises:
   a first layer adjacent the first electrode;
   a second layer positioned between the first layer and the second electrode; and
   a plurality of solid electrolyte components extending along an axis defined by a flow of ions within the cell during charge or discharge of the cell from the first layer toward the second layer, wherein
   the at least one first thin-film deposition formed volume change accommodating feature comprises a void having a first plurality of disks formed therein, each of the first plurality of disks extending generally along the axis,
   the second electrode comprises an anode,
   the first plurality of disks comprise a form of silicon,
   the second electrode includes at least one second thin-film deposition formed volume change accommodating feature,
   the at least one second thin-film deposition formed volume change accommodating feature comprises a void having a second plurality of disks formed therein, each of the second plurality of disks extending generally along the axis, and
   the second plurality of disks comprise a form of sulfur.

2. The cell of claim 1, wherein the void in the second electrode is filled with a compressible substance.

3. The cell of claim 1, wherein the at least one first thin-film deposition formed volume change accommodating feature comprises a plurality of voids having a generally circular cross-section along a plane perpendicular to an axis defined by a flow of ions within the cell during charge or discharge of the cell.

4. A method of forming an electrochemical cell, comprising:
   providing a first current collector;
   forming at least one first volume change accommodating feature associated with a silicon structure supported by the first current collector using a thin-film deposition process by forming a void having a first plurality of disks formed therein, each of the first plurality of disks extending generally along an axis perpendicular to a surface of the first current collector;
   providing a second current collector;
   forming at least one second volume change accommodating feature associated with a sulfur structure supported by the second current collector using the thin-film deposition process, wherein the second electrode includes the second current collector the at least one second volume change accommodating feature and the second structure, by forming a void having a second plurality of disks formed therein, each of the second plurality of disks extending generally along the axis when the cell is finally formed; and
   positioning a separator between (i) a first electrode including the first current collector, the at least one first volume change accommodating feature, and the first structure, and (ii) a second electrode.

5. The method of claim 4, further comprising:
   filling the void with the second plurality of disks formed therein with a compressible substance.

6. The method of claim 5, wherein positioning the separator comprises:
   providing a first layer;
   providing a second layer;
   extending a plurality of solid electrolyte components between the first layer and the second layer;
   positioning the first layer adjacent the first structure; and
   positioning the second layer between the first layer and the second structure, such that the plurality of solid electrolyte components extend along the axis when the cell is finally formed.

7. The method of claim 4, wherein forming at least one first volume change accommodating feature comprises:
   forming a first plurality of voids using the thin-film deposition process, each of the first plurality of voids having a generally circular cross-section along a plane perpendicular to an axis defined by a flow of ions within the cell during charge or discharge of the cell when the cell is finally formed.

8. The method of claim 7, wherein forming at least one first volume change accommodating feature comprises:
   forming a second plurality of voids using the thin-film deposition process, each of the second plurality of voids having a generally ovoid cross-section along the plane perpendicular to the axis.

9. An electrochemical cell, comprising:
   a cathode;

an anode spaced apart from the cathode, the anode including (i) at least one first thin-film deposition formed volume change accommodating feature comprising a void having a first plurality of disks comprising a form of silicon formed therein, each of the first plurality of disks extending generally along an axis defined by a flow of ions within the cell during charge or discharge of the cell, and (ii) at least one second thin-film deposition formed volume change accommodating feature comprising a void having a second plurality of disks comprising a form of sulfur formed therein, each of the second plurality of disks extending generally along the axis; and a separator positioned between the cathode and the anode.

10. The cell of claim 9, wherein the void in the second electrode is filled with a compressible substance.

11. The cell of claim 10, wherein the separator comprises:
a first layer adjacent the cathode;
a second layer positioned between the first layer and the anode; and
a plurality of solid electrolyte components extending along the axis from the first layer toward the second layer.

12. The cell of claim 9, wherein the at least one first thin-film deposition formed volume change accommodating feature comprises a plurality of voids having a generally circular cross-section along a plane perpendicular to an axis defined by a flow of ions within the cell during charge or discharge of the cell.

* * * * *